United States Patent
Ghatare (10) Patent No.: US 10,147,334 B2
(45) Date of Patent: Dec. 4, 2018

(54) LEARNING PLATFORM FOR INCREASING MEMORY RETENTION OF DEFINITIONS OF WORDS

(71) Applicant: Sanjay Ghatare, San Jose, CA (US)

(72) Inventor: Adishree S. Ghatare, San Jose, CA (US)

( * ) Notice: Subject to any disclaimer, the term of this patent is extended or adjusted under 35 U.S.C. 154(b) by 222 days.

(21) Appl. No.: 15/150,141

(22) Filed: May 9, 2016

(65) Prior Publication Data

US 2017/0323576 A1    Nov. 9, 2017

(51) Int. Cl.
*A63F 9/24* (2006.01)
*G09B 5/08* (2006.01)
*G09B 19/06* (2006.01)

(52) U.S. Cl.
CPC .............. *G09B 5/08* (2013.01); *G09B 19/06* (2013.01)

(58) Field of Classification Search
CPC ............. G09B 5/00; G09B 5/125; G09B 7/02
See application file for complete search history.

(56) References Cited

U.S. PATENT DOCUMENTS

| | | | | | |
|---|---|---|---|---|---|
| 5,827,071 | A | * | 10/1998 | Sorensen | G09B 5/065 345/211 |
| 2004/0005533 | A1 | * | 1/2004 | Reyes | G09B 17/00 434/178 |
| 2009/0248960 | A1 | * | 10/2009 | Sunderland | G06F 17/30 711/103 |
| 2011/0123967 | A1 | * | 5/2011 | Perronnin | G09B 7/02 434/178 |
| 2011/0318723 | A1 | * | 12/2011 | Jeong | G09B 7/08 434/350 |
| 2013/0047115 | A1 | * | 2/2013 | Migos | G06F 17/241 715/776 |
| 2015/0186346 | A1 | * | 7/2015 | Mesguich Havilio | G06F 3/04842 715/256 |

\* cited by examiner

*Primary Examiner* — Steve Rowland
(74) *Attorney, Agent, or Firm* — Lowenstein Sandler LLP (57) ABSTRACT

A processing device receives an input of a word that is to be learned by a user, performs a search for a definition of the word using a search engine, and receives the definition of the word based on the search. The processing device prompts the user to rewrite the definition and receives a user input of a new definition for the word. The processing device prompts the user to select a vocabulary learning mode from a group of vocabulary learning modes consisting of: a story mode, an etymology mode, an image mode and a word connections mode. The processing device receives a selection of a vocabulary learning mode from the group of vocabulary learning modes and provides a user interface and one or more tools for generation of a card for study of the word, wherein the one or more tools are based on the selected vocabulary learning mode. The processing device generates the card responsive to user input and then saves the card.

20 Claims, 8 Drawing Sheets

LEARNING PLATFORM FOR INCREASING MEMORY RETENTION OF DEFINITIONS OF WORDS

BACKGROUND OF THE INVENTION

Field of the Invention

Embodiments of the present invention relates to software tools for assisting the learning process of vocabulary words. In particular, embodiments of the present invention relate to providing a platform that aids a user with vocabulary retention, such as by creating stories, using etymology, creating an image, and using word connections.

Discussion of the Related Art

Vocabulary is crucial for communication in society. With a better understanding of vocabulary, individuals can be taken more seriously, understand what others are saying, and communicate succinctly. Understanding the connotations of words allows people to understand the context of words and provides insight into the thought process of a speaker and his/her personality. It follows that vocabulary plays a significant role in education. Almost all major tests, such as the Scholastic Assessment Test, Graduate Record Examinations, and Medical College Admission Test, have a vocabulary-based section. Often test-takers end up memorizing definitions of words that appear in tests. Memorizing without understanding does not result in very high retention rates and defeats the purpose of the exam.

Repeated testing is, besides memorization, a common learning method. Often what happens with repeated testing is that the word becomes associated with that very short definition without context and its usage. A short definition may not hold for complicated ideas. Just forgetting or changing one part of the definition can dramatically change understanding of a word.

BRIEF DESCRIPTION OF THE DRAWINGS

Embodiments of the present invention will be understood more fully from the detailed description given below and from the accompanying drawings. The drawings should not be taken to limit the invention to the specific illustrated embodiments, but are for explanation and understanding only.

DETAILED DESCRIPTION

Embodiments of the present invention will be understood more fully from the detailed description given below and from the accompanying drawings of the preferred embodiment of the invention, which, however, should not be taken to limit the invention to the specific embodiment but are for explanation and understanding only.

Embodiments of the present invention describe a system that assists users in remembering the definitions of words. Often the methods of learning words are ineffective, thus nullifying the purpose of learning. When an experience happens, neurons in our brain fire together to construct the memory with elements of that experience. When we remember, we reconstruct the memory of the experience by re-firing the neurons that fired together during the original experience. Memories start as sensory memories, and then become short-term memories. From the short-term memory, our brains have to make a conscious, active effort to transfer this memory to long-term.

There are multiple ways to increase memory retention. Repetition is helpful as the neurons are re-firing, and thus strengthening their connections. Giving meaning and associating with known things, past experiences, etc. increases the number of connections the neurons have, thus creating a more prominent and stronger memory. A person will be more likely to retain ideas they have more interest in. This concept is called motivation. Reading aloud, or hearing the word, helps as you can remember the concept with more senses. Similarly, attributing a visual image to the word will also increase retention. Embodiments of the present invention utilize methods which use all of these techniques to assist a user to learn and retain vocabulary definitions.

Figure 1:
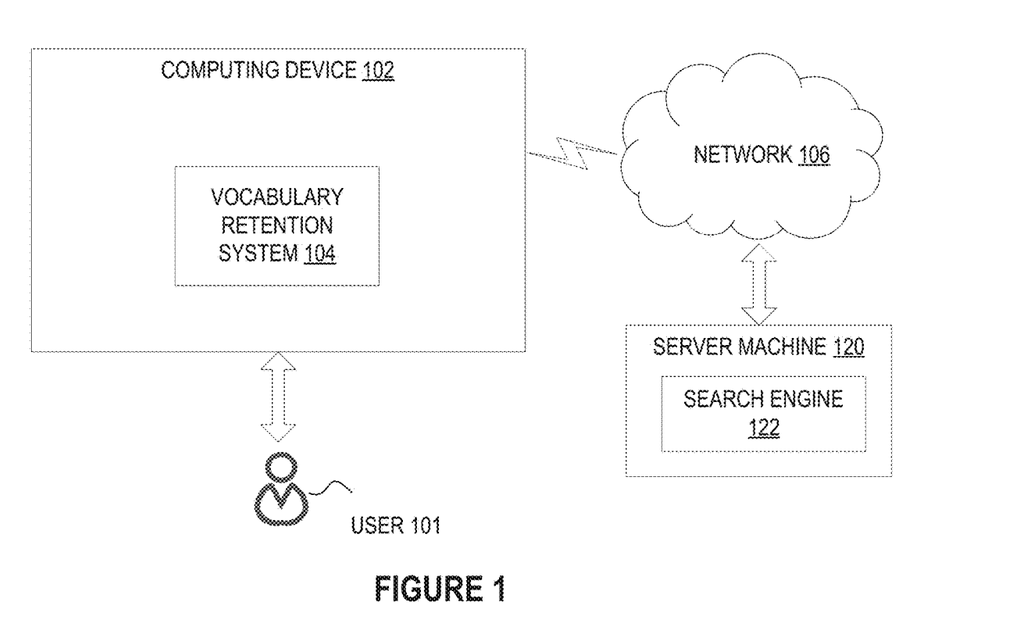
FIG. 1 illustrates an example network architecture in which embodiments of the present invention may operate.

FIG. 1 illustrates an example network architecture 100 in which embodiments of the present invention may operate. The network architecture 100 may include a computing device 102 connected to a server machine 120 via a network 106. The network 106 may be a public network such as the Internet, a private network such as a local area network (LAN), or a combination thereof. The computing device 102 may include any type of mobile or stationary computing device, such as an electronic book reader, a portable digital assistant, a mobile phone, a laptop computer, a portable media player, a tablet computer, a camera, a desktop computer, a gaming console, and the like.

The computing device 102 includes a vocabulary retention system 104. The vocabulary retention system may be an application (also referred to as an "app" that executes on the computing device 102. A user 101 may interface with a graphical user interface (GUI) of the vocabulary retention system 104. The vocabulary retention system 104 may send queries to and receive responses from a search engine 122 executing on the server machine 120. The search engine 122 may be, for example, the Google® search engine or any other search engine.

Figure 2:
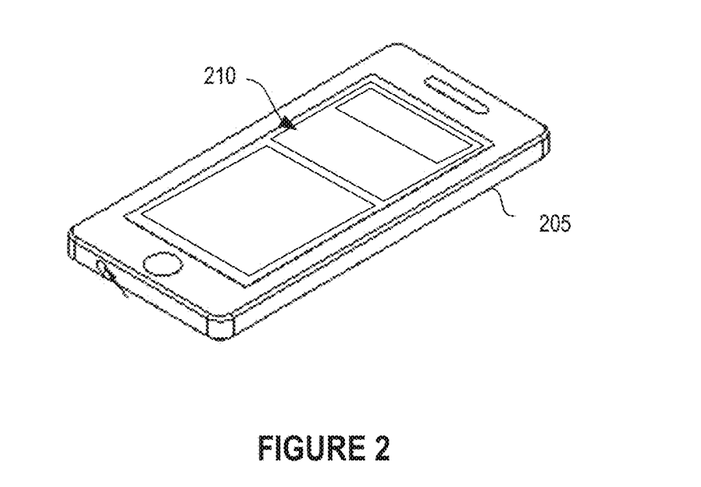
FIG. 2 illustrates an example computing device that implements embodiments of the present invention.

FIG. 2 illustrates an example computing device 205 that implements embodiments of the present invention. The example computing device 205 is a mobile phone. An example user interface 210 of the vocabulary retention system 104 is shown on a display of the computing device 205.

Figure 3:
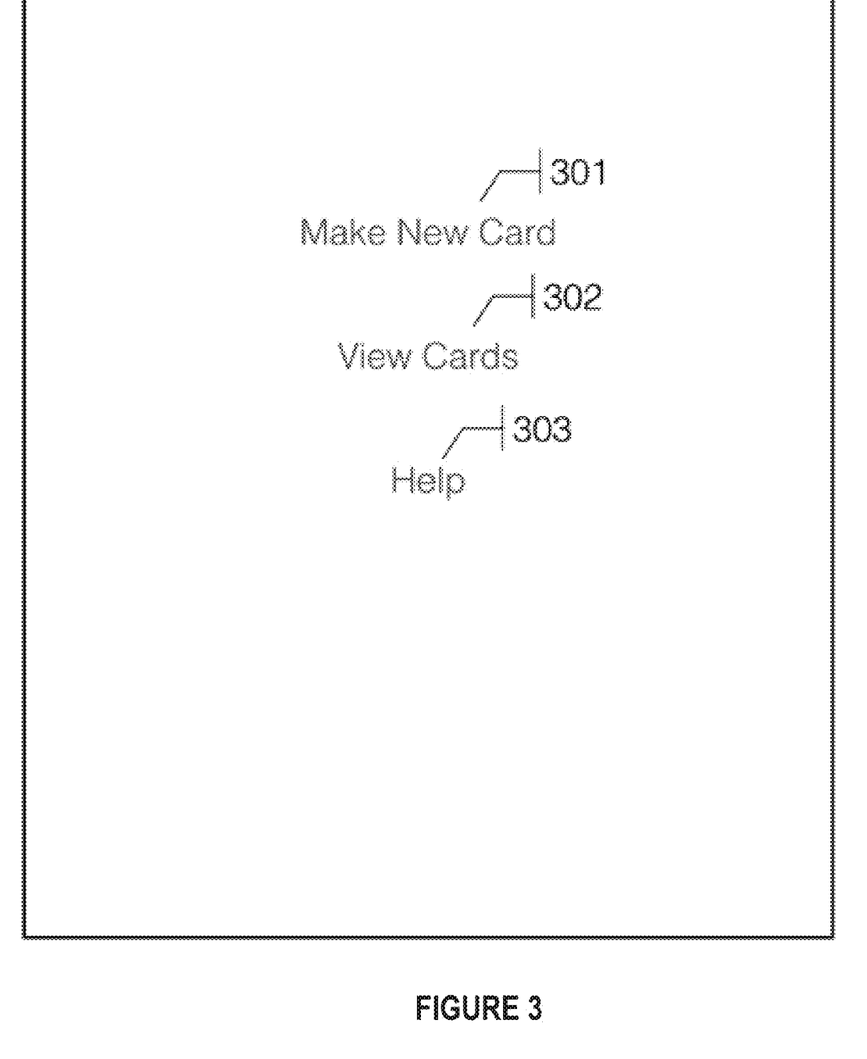
FIG. 3 illustrates a user interface of a main menu of a vocabulary retention system, in accordance with one embodiment of the present invention.

FIG. 3 shows a user interface of the main menu of a vocabulary retention system, in accordance with one embodiment of the present invention. From the main menu, multiple options for techniques to assist in vocabulary retention are provided and/or displayed. The options are button 301 "Make New Card," button 302 "View Cards," and button 303, "Help". This user interface is better understood in terms of the flowchart shown in FIG. 4.

A card is a representation of the information the user finds and deems important for understanding the word. The card would include the word, the definition that the user writes after researching, and a representation of the user's use of the modes offered which will be described later in this document. The modes may include a story mode, an etymology mode, an image mode, and a word connections mode. Each mode may output different data that may be recorded in a card to aid in vocabulary learning and retention. The card may have data generated with more than one mode if the user chooses to use more than one mode or the processing system may generate separate cards for each mode. The finished cards will be saved in storage and can be accessed and viewed.

Figure 4:
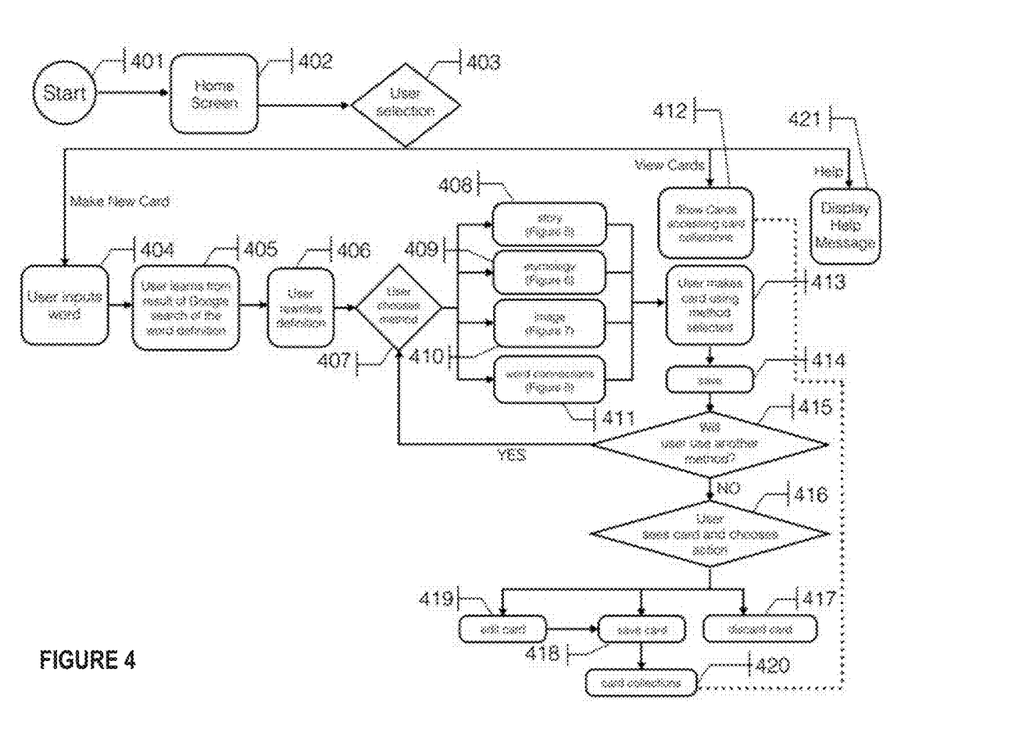
FIG. 4 illustrates a flow chart of a method to facilitate vocabulary retention, in accordance with one embodiment of the present invention.

FIG. 4 illustrates a flow chart of a method to facilitate vocabulary retention, in accordance with one embodiment of the present invention. The method may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a vocabulary retention system executing on a computing device. The computing device may be a mobile computing device such as a mobile phone, a tablet computer, a laptop computer, a portable digital assistant (PDA), a portable game console, and so on. The computing device may also be a traditionally stationary computing device such as a desktop computer, a blade server, a rackmount server, and so on.

The method starts in block 401, where the system is initialized and then moves to block 402. At block 402, processing logic presents a user with three options, as can be seen in FIG. 3. In block 403, processing logic waits for user input. If the user clicks on the "View Cards" button 302 on the screen shown in FIG. 3, the process moves to block 412 and accesses card collections, block 420, which is storage for all the cards the user makes. If the user clicks on the "Help" button 303 on the screen shown in FIG. 3, the process moves to block 421, which displays a page that discusses how the application works and hints on how to better utilize the application. If the user clicks on "Make New Card" button 301 on the screen shown in FIG. 3, the process moves to block 404, in which user is asked for a word for the new card. Next the process moves to block 405 where a search request is sent to a search engine for a definition of the word. The search engine may be a public search engine available on the Internet, such as the Google® search engine, the Bing® search engine, the Yahoo® search engine, and so on. Processing logic receives search results that are responsive to the search request, and will present the search results in a section of the screen (e.g., in a browser window or box).

The word may also be displayed. For example, if the word is chocolate, the search may be "define chocolate." This helps the user to completely understand the word. They can gain context of the word more than just seeing the definition.

The process moves to block 406 where the user is asked to rewrite the definition in their own words. By doing this, they are reframing the definition in ways they understand the word. Association is the concept that ideas that have closer connection to you will have higher retention rates. When the user rewrites the definition, they are making the definition closer to what they would understand, thus utilizing association. Rewriting the definition also utilizes motivation. Motivation is the memory concept that ideas with stronger interest to a person will be more easily retained than ideas with less interest.

After the user has written the definition, the process moves to block 407. A new frame shows the word, the user-written definition from block 406, and a list of methods that are story, etymology, image, word connections. Each of these methods is associated with a different vocabulary learning mode of the vocabulary learning system. For example, the story method is associated with a story mode, the etymology method is associated with an etymology mode, the image method is association with an image mode, and the word connections method is associated with a word connections mode. Each mode may provide a user interface and one or more tools for generation of a card for study of a word. Different vocabulary learning modes may have different user interfaces and may include different tools. The user is allowed to choose one method at a time. Block 407 waits for the user to select one method.

Figure 5:
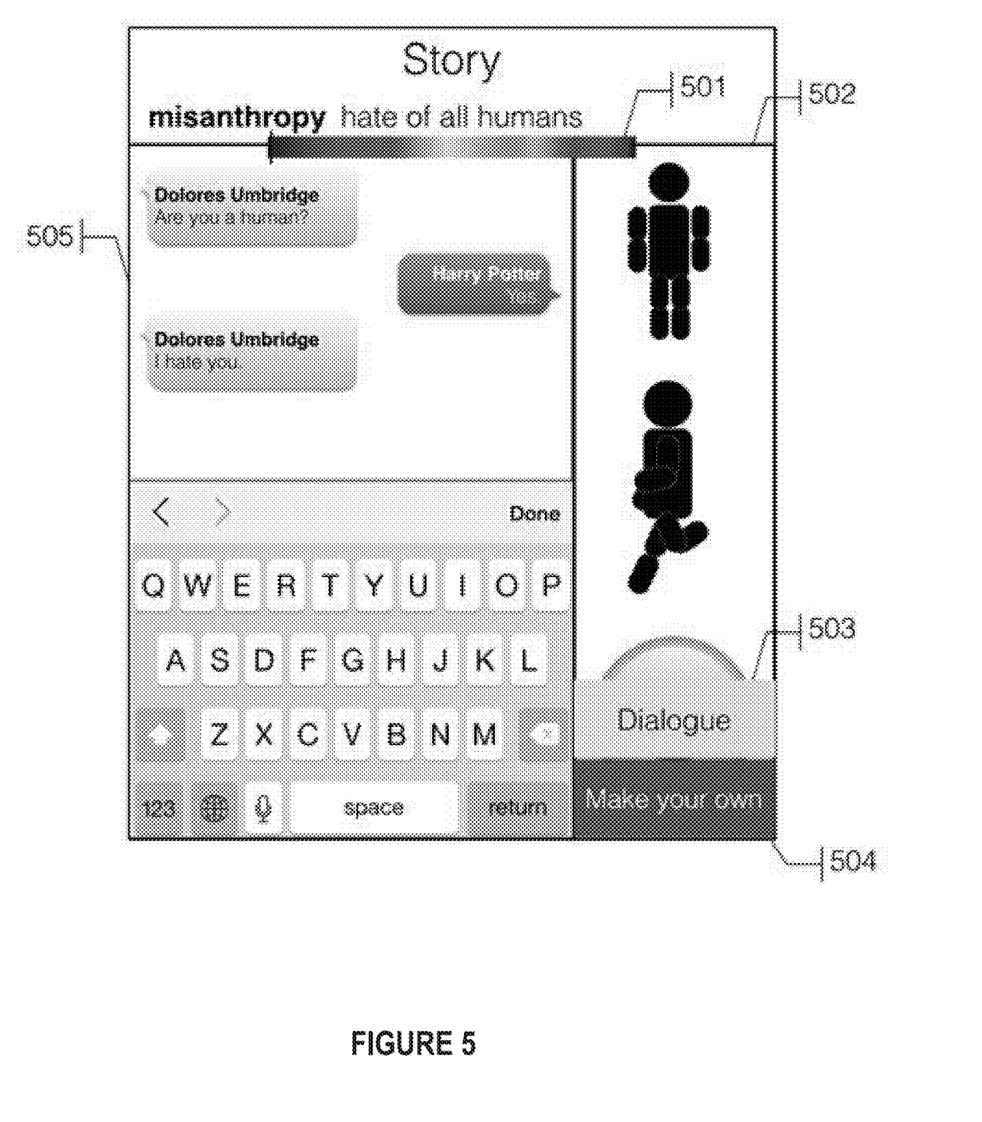
FIG. 5 illustrates an example of a user interface for a user to fill a card using the story method, in accordance with one embodiment of the present invention.

If the user selects the story method at block 407, the process moves to block 408 and the vocabulary retention system may enter the story mode. The story mode is depicted in FIG. 5, which shows an example of how the user interface may look when an implementation of the story mode by the vocabulary retention system is in use. In the story mode, the user is asked to construct a story using provided tools to help them remember the word. The story mode is a platform in which the user can depict a story. This can be done in a dialogue conversation that looks somewhat like a text message conversation if the user clicks on button 503, the "Dialogue" button. The user can select characters from a bank that is on the right side, 502 in the figure. This bank is a tool that contains several common characters in different poses such as standing, lying, and running. The bank also has common items such as baskets, pencil, and paper. These can be dragged to and resized on the drawing board 505 (another tool). The colors of these objects can be chosen by dragging a slider 501 (another tool). The user can select the option "Make your own," button 504, to free-draw using a drawing tool. They can also select different colors to draw with using the slider 501.

The user can also select the option "Dialogue" to make a dialogue conversation between characters they name by clicking button 503, the "Dialogue" button. User can add text inside dialogue bubbles. Each character in the conversation has text bubbles in different colors.

The story method utilizes techniques that increase retention. Some techniques are color, emotion, motivation, and association. If a person is making a story about something, they are most likely to think of things that have more personal and emotional attachment to them. By motivation, the story is more likely to be retained than a definition, which often has less emotional attachment. A good contrast in color also improves retention. When a person makes a story, they imagine a situation. When we imagine a situation, we add sensations from more senses. We start to think more about sights, smells, sounds, feelings, and taste. When we have more information on something, it becomes easier to retain. Often, when we make a story, we use previous knowledge and experience. Thus, making a story utilizes association, thus increasing retention. For example, if the user likes and knows the *Harry Potter®* series, then stories with references to the *Harry Potter®* series are more easily retained.

Figure 6:
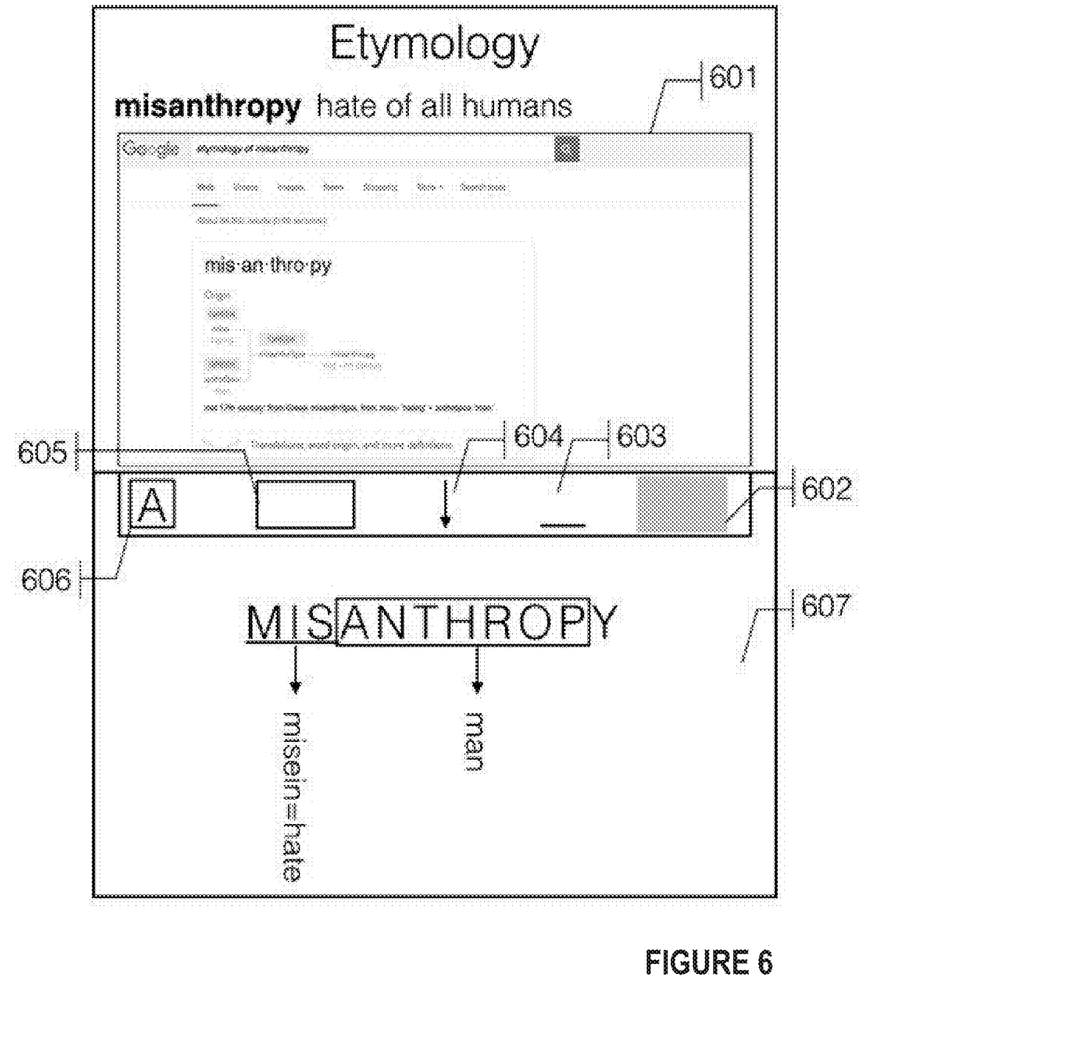
FIG. 6 illustrates an example of a user interface for a user to fill a card using the etymology method, in accordance with one embodiment of the present invention.

If the user selects the etymology method at block 407, the process moves to block 409 and the vocabulary retention system may enter the etymology mode. The etymology mode is depicted in FIG. 6. FIG. 6 shows an example of how the user interface may look when an implementation of the etymology mode by the vocabulary retention system is in use. If the user selects the etymology method, they see the selected or input word followed by its definition, a browser, and a building board. The browser, 601 in the figure, provides a search result for a search of the etymology of the word. Specifically, processing logic sends a search request to a search engine (e.g., to the Google® search engine), where the search includes the word and the term "etymology." The browser then receives and/or displays one or more top results of the search. For example, if the word being learnt is "misanthropy," the phrase "etymology of misanthropy" will be entered into the search engine.

The building board 607 is a tool of the etymology mode. The building board 607 may be a section of the screen in which the user can represent the etymology they learned. They may want to write the word and assign certain parts of the words to the definitions of roots related to the word. This may be what is stored in the card for the etymology section. In the building board 607, the user can drag text boxes (button 606), boxes (button 605), arrows (button 604), underlines (button 603), and highlights (button 602) from a menu.

The etymology method utilizes prospective memory. Prospective memory is memory that is remembered by cues. By knowing what each part of the word means, the person is able to find the meaning in the word. Let's take the word misanthropy. The user knows "mis-" is short for "misein" which means hate in Greek. "Anthro" means human in Greek. So after knowing this, the definition of misanthropic can be found in the word itself. Another example is the word obeisance which means "deferential respect". So the word cue could be obey (obei) in French.

Figure 7:
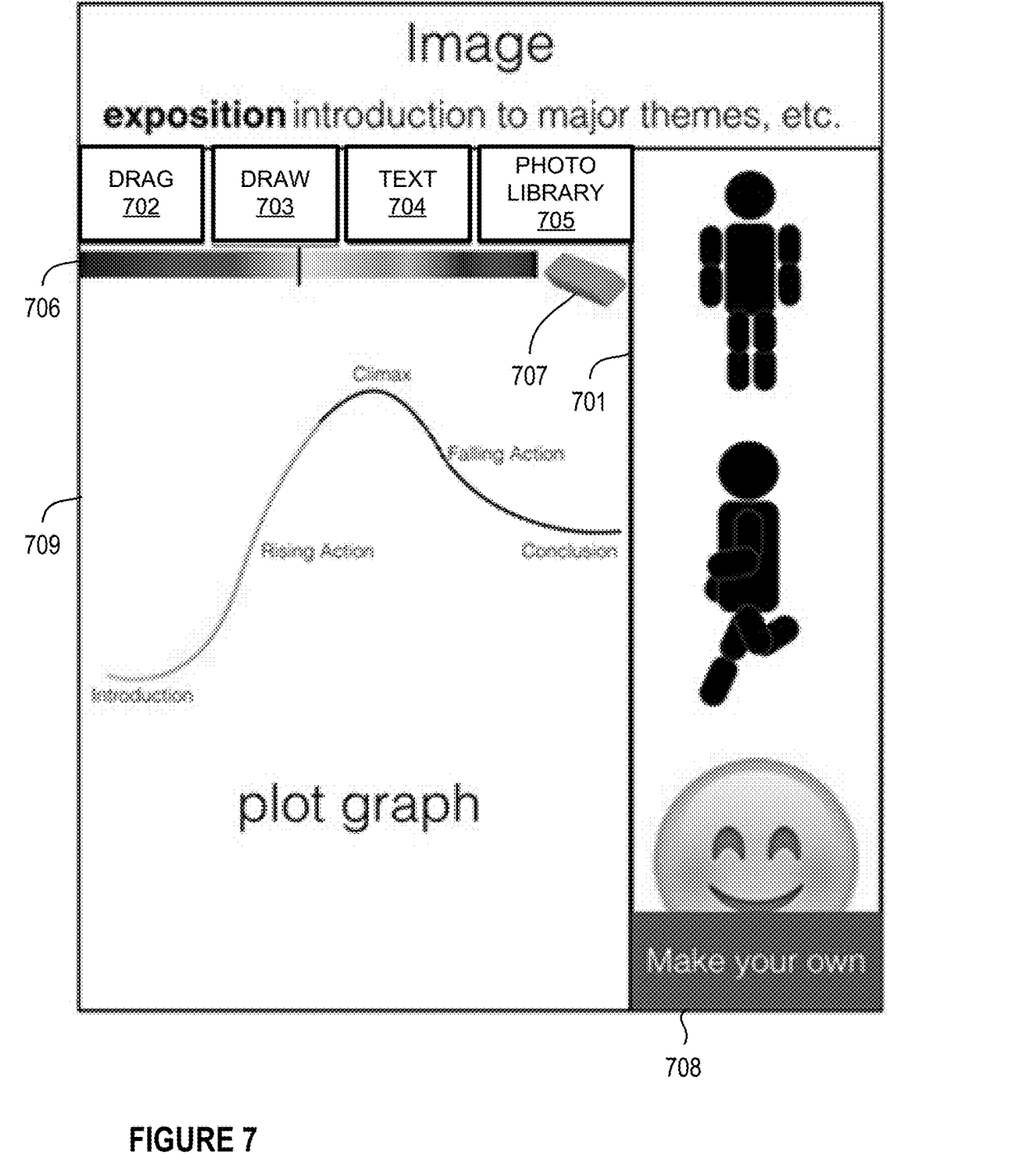
FIG. 7 illustrates an example of a user interface for a user to fill a card using the image method, in accordance with one embodiment of the present invention.

If the user selects the image method at block 407, the process moves to block 410 and the vocabulary retention system may enter the image mode. The image mode is depicted in FIG. 7, which shows an example of how the user interface may look when an implementation of the image mode (also referred to simply as the image association mode) is in use.

The third method is the image method. The user is asked to create an image to help them remember the word. If the user selects the image method, the user will be presented with the word, its definition, a drawing board 709, and an object bank 701. The drawing board 709 and object bank 701 are tools of the image mode. The user can drag, draw, create a text box, or select an image from the device's photo library. If the "Drag" button 702 is selected, the user can drag objects across the drawing board (709), from the bank (701), and resize items. The "Draw" button 703 allows the user to draw using a color that they select. Colored bar 706 is a color spectrum with a thin vertical black bar that the user can use to change color. Whatever color the vertical bar is on is the color that will be used to draw. When button 707 is selected, the area that the user selects will return to its initial state when the process first moved to block 410. "Text" button 704 generates a field with editable text that goes on the drawing board. "Photo Library" button 705 accesses the device photo library and allows the user to choose an image. This photo is then shown on the drawing board. The user can select characters from a bank that is on the right side, 701 in the figure. This bank contains several common characters in different poses such as standing, lying, and running. The bank also has common items such as baskets, pencil, and paper. The user can select the option "Make your own," button 708, to free-draw a character to add to the bank. They can also select different colors to draw with by using a slider similar to colored bar 706.

The image method utilizes motivation and association. The first ideas that the user's mind generates are usually those with higher emotional value. These are more easily remembered. The visual aspect of the image adds more depth and sense to the memory.

Figure 8:
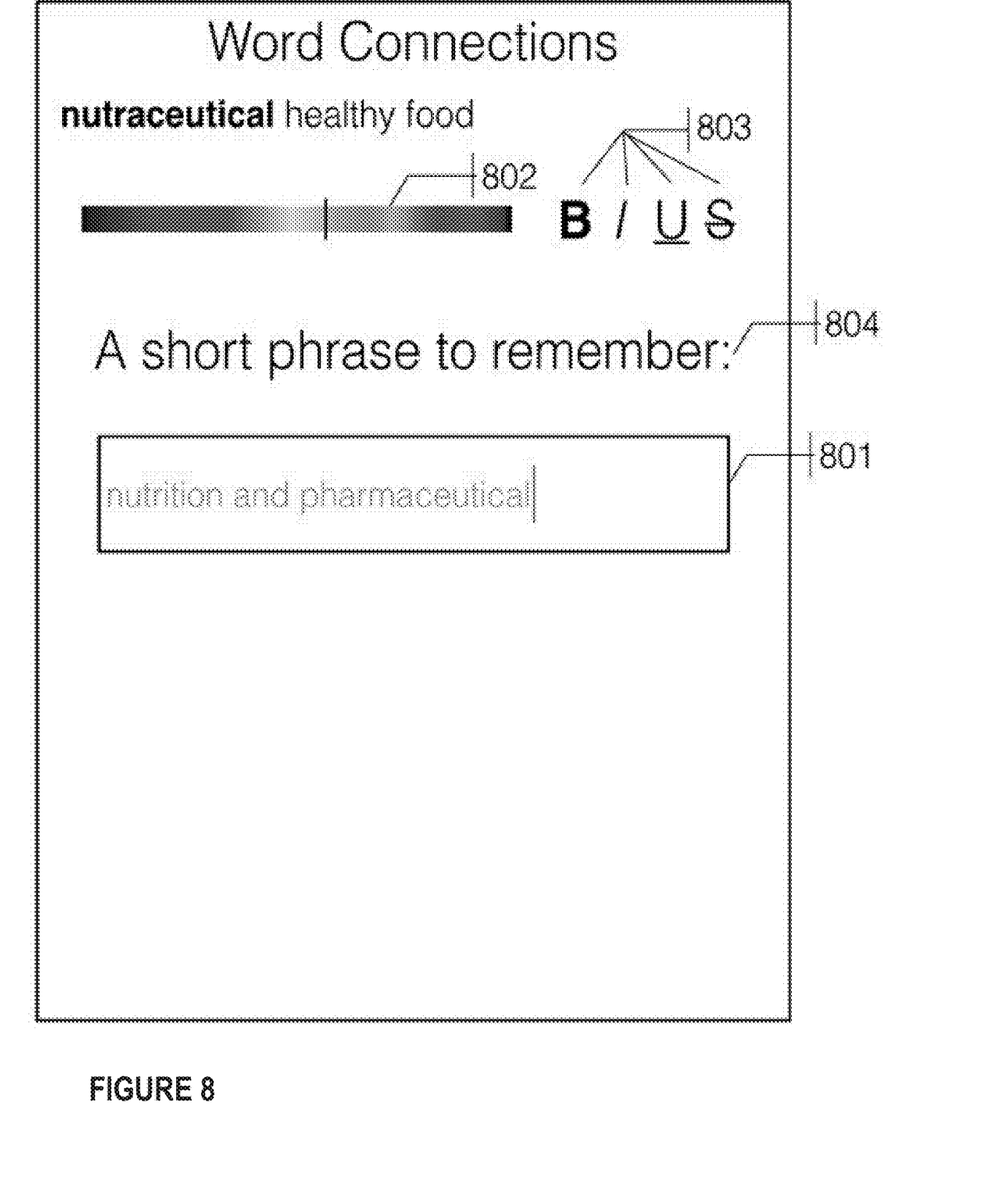
FIG. 8 illustrates an example of a user interface for a user to fill a card using the word connections method, in accordance with one embodiment of the present invention.

If the user selects the word connections method at block 407, the process moves to block 411 and the vocabulary retention system enters the word connections mode. The word connections method is depicted in FIG. 8, which shows an example of how the user interface may look when an implementation of the word connections mode is in use. The user is asked to write a phrase to help them remember the definition. The layout of the word connections mode is the word, definition, a prompt message, and a text field. The word and its definition are across the screen at the top. The prompt message, 804 in the figure, is static text: "A short phrase to remember". Below the prompt message is an editable text field, 801 in the figure, in which the user can write the phrase that helps them remember the definition of the word. For example, nutraceutical is a portmanteau of the words nutrition and pharmaceutical. So the user can write 'nutrition and pharmaceutical' as a reminder. The user is presented with the following formatting options (shown as 803 in the figure): bold, italics, strikethrough, and underline. The machine will use the color selected on the color slider 802 to write the message.

Word connections method utilizes the idea of prospective memory. This can be used for the words that sound very similar to words they mean. It is also for words that have common roots. It is much easier to remember one or two words that sound similar to the word than a long definition. If the word connection sounds similar to the word itself, when the user sees the word, they can more easily remember the definition. The formatting options of the text can be used to capture the emotions associated with words.

The process moves to block 413, where the user is asked to make the card based on the selection made at block 407. Then it moves to block 414 where the system saves the card. The process moves to block 415 where the system asks the user if they want to use another method. If the answer is "yes," the process repeats from block 407 until the answer is "no." If the answer is "no," the process moves to block 416 where the user is shown the card and given options. The user can edit the card (block 419), save the card (block 418), or discard the card (block 417). If the user chooses to edit the card, the process moves to block 419. From block 419, the process moves to block 418 where the card is saved to the card collection.

In some embodiments, multiple cards are created for a single word, where each card is created in association with a different vocabulary learning mode. Alternatively, a single card may have different sections, and each section may include information that has been added by a particular vocabulary learning mode. For example, a single card may include an etymology section based on information added in the etymology mode and a story section based on information added in the story mode. In one embodiment, to create a single card with multiple sections a user selects multiple existing cards for a word and initiates a combine action. This may cause the contents of these two cards to be merged to form a single card having multiple sections.

Embodiments of the present invention provide a vocabulary retention system that helps users to more effectively retain definitions of words due at least in part to a focus on user-based research and a focus on learning and understanding rather than testing and memorizing.

Focus on user-based research. Rather than just having the definition given to a user or just entering the definition, embodiments of the present invention facilitate and promote the user to conduct a more thorough research of the word. This will enhance retention as the user has to do their own research. This causes more time to be spent learning a vocabulary word rather than simply reading a definition. Often times, a book definition or the first definition in a dictionary may not help the person to realize the complete meaning of the word. Looking through image search results on a word may help them however. Embodiments of the present invention offer a more in-depth and an opportunity to write a more personal definition for the user. By learning some context of the word before writing the definition, the user will have the opportunity to add his/her personal interpretation and encompass more of their emotion into the word.

Focus on learning and understanding rather than testing. Conventional vocabulary study systems focus on testing and provide generic predetermined definitions to users. No extra measures are taken to help the user to understand the concept other than flashcards. Additionally, a database for such systems may not have explanations that cover all words. Also, an explanation written by someone else does not help the user to remember the word as effectively as an explanation written by the user. When embodiments of the present invention are used, by contrast, the user learns more thoroughly and creates a self-written visual explanation. The user knows exactly what will help them to remember the word. This is a more thorough and effective learning process.

Figure 9:
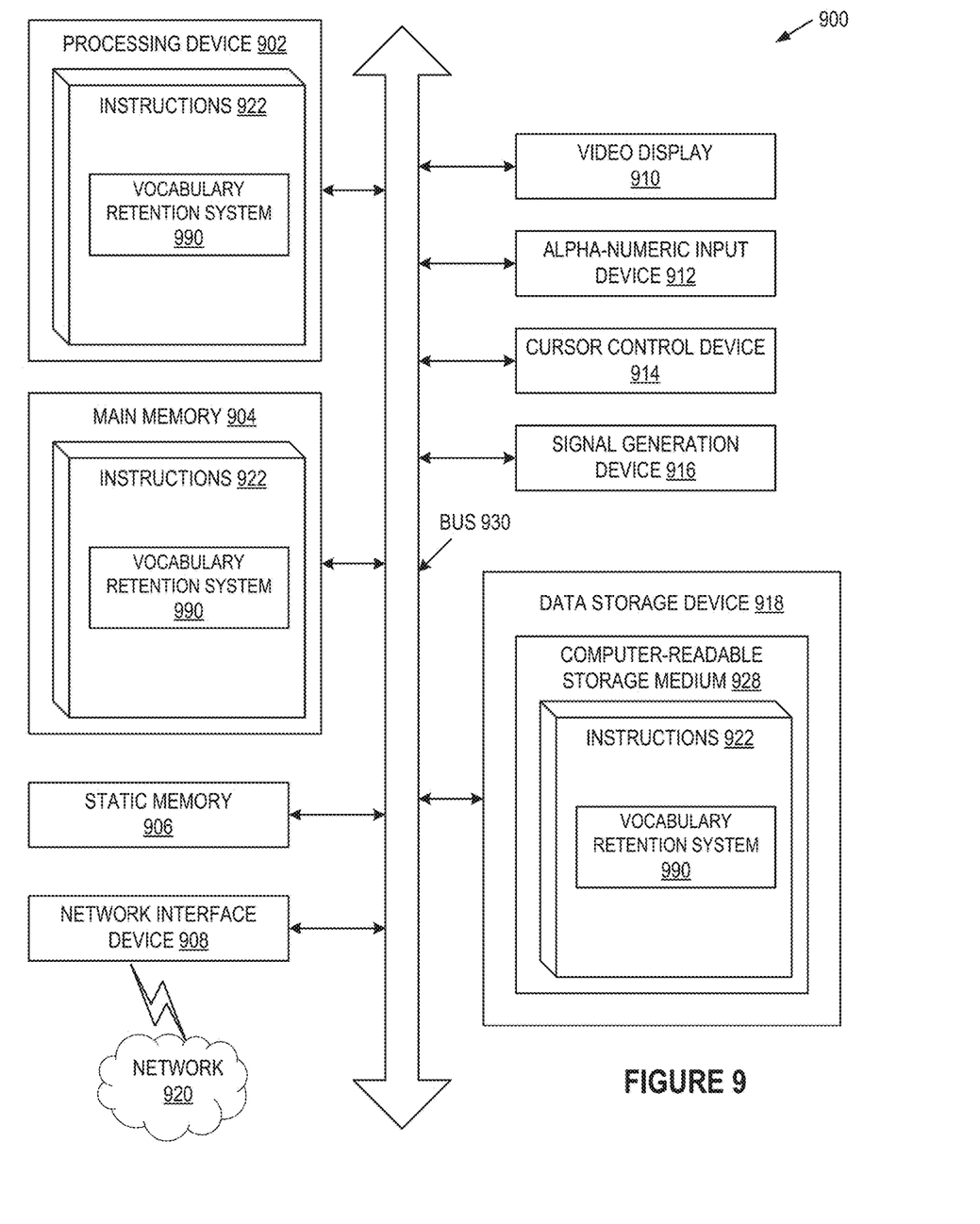
FIG. 9 illustrates an example computing device that may perform operations associated with embodiments of the present invention.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display (LCD), an alphanumeric input device 912 (e.g., a keyboard, a touchpad, a touchscreen, etc.), a cursor control device 914 (e.g., a mouse, a touchpad, a touchscreen, etc.), and a signal generation device 916 (e.g., a speaker).

The data storage device 918 may include a machine-readable storage medium (or more specifically a computer-readable storage medium) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The computer-readable storage medium 928 may also be used to store a vocabulary retention system 990 (as described herein above), and/or a software library containing methods that call an a vocabulary retention system 990. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "performing", "determining", "prompting", "providing", or the like, refer to the actions and processes of a computer computing device that manipulates and transforms data represented as physical (electronic) quantities within the computing device's registers and memories into other data similarly represented as physical quantities within the computing device's memories or registers or other such information storage, transmission or display devices.

Embodiments of the present invention also relate to an apparatus for performing the operations herein. This apparatus may be specially constructed for the discussed purposes, or it may comprise a general purpose computing device selectively programmed by a computer program stored in the computing device. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although embodiments of the present invention have been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, an input of a word that is to be learned by a user;
    performing, by the processing device, a search for a definition of the word using a search engine, wherein performing the search for the definition of the word comprises:
        generating a search query for the definition of the word; and
        sending the search query to the search engine, wherein the search engine comprises a public search engine accessible via a network;
    receiving, by the processing device, one or more search results based on the search query;
    selecting the definition of the word from the one or more search results;
    prompting, by the processing device, the user to rewrite the definition;
    receiving, by the processing device, a user input of a new definition for the word;
    prompting, by the processing device, the user to select a vocabulary learning mode from a group of vocabulary learning modes comprising a story mode, an etymology mode or an image mode;
    receiving, by the processing device, a selection of a vocabulary learning mode from the group of vocabulary learning modes;
    providing, by the processing device, a user interface and one or more tools for generation of a card for study of the word, wherein the one or more tools are based on the selected vocabulary learning mode;
    generating the card by the processing device; and
    saving the card by the processing device.

2. The method of claim 1, wherein the selected vocabulary learning mode of the group of vocabulary learning modes is the story mode, the method further comprising:
    receiving a selection of one or more characters for a story associated with the definition of the word;
    receiving a placement for the one or more characters;
    receiving a user input of dialogue for the one or more characters, wherein the dialogue is associated with the definition of the word; and
    generating the card comprising the one or more characters and the dialogue.

3. The method of claim 2, further comprising:
    providing a selection of a plurality of pre-generated characters, wherein the one or more characters are selected from the plurality of pre-generated characters.

4. The method of claim 2, further comprising:
    providing a selection of a plurality of pre-generated objects;
    receiving a selection of one or more objects from the plurality of pre-generated objects; and
    receiving a placement of the one or more objects, wherein the card further comprises the one or more objects.

5. The method of claim 1, wherein the selected vocabulary learning mode of the group of vocabulary learning modes is the etymology mode, the method further comprising:
    performing an additional search for an etymology of the word using the search engine;
    receiving the etymology of the word based on the additional search;
    displaying the etymology of the word;
    receiving a user selection of at least one of text, a box, an arrow, an underline, or a highlight;
    receiving a user selection of a portion of the word to apply at least one of the text, the box, the arrow, the underline, or the highlight to; and
    placing at least one of the text, the box, the arrow, the underline, or the highlight in relation to the portion of the word.

6. The method of claim 5, wherein:
    performing the additional search for the etymology of the word comprises:
        generating a new search query for the etymology of the word; and
        sending the new search query to the search engine; and
    receiving the etymology of the word comprises:
        receiving one or more new search results based on the new search query; and
        selecting the etymology from the one or more new search results.

7. The method of claim 1, wherein the selected vocabulary learning mode of the group of vocabulary learning modes is the image mode, and wherein the one or more tools comprise drawing tools for drawing a picture, the method further comprising:

receiving user input to draw a digital image.

8. The method of claim 1, wherein the group of vocabulary learning modes further comprises a word connections mode, and wherein the selected vocabulary learning mode of the group of vocabulary learning modes is the word connections mode and the one or more tools comprise font selection tools, the method further comprising:

prompting the user to enter a phrase associated with the word;

receiving user input for the phrase; and receiving user input for at least one of a bold font, an italics font, a strikethrough font, or an underline font for a portion of the phrase.

9. The method of claim 1, each of the story mode, the etymology mode, and the image mode implements at least one of a motivation-based learning technique, an association-based learning technique, an emotion-based learning technique, or a color-based learning technique to facilitate retention of the definition of the word, the method further comprising:

receiving an additional selection of a second vocabulary learning mode from the group of vocabulary learning modes;

providing an additional user interface and one or more additional tools for generation of an additional card for study of the word, wherein the one or more additional tools are based on the second vocabulary learning mode; and saving the additional card.

10. The method of claim 9, further comprising:

combining the card and the additional card to generate a single card having a first section comprising information from the card and a second section comprising additional information from the additional card.

11. A non-transitory computer readable storage medium comprising instructions that, when executed by a processing device, cause the processing device to perform operations comprising:

receiving, by the processing device, an input of a word that is to be learned by a user;

performing, by the processing device, a search for a definition of the word using a search engine, wherein performing the search for the definition of the word comprises:

generating a search query for the definition of the word; and sending the search query to the search engine, wherein the search engine comprises a public search engine accessible via a network;

receiving, by the processing device, one or more search results based on the search query;

selecting the definition of the word from the one or more search results;

prompting, by the processing device, the user to rewrite the definition;

receiving, by the processing device, a user input of a new definition for the word;

prompting, by the processing device, the user to select a vocabulary learning mode from a group of vocabulary learning modes comprising a story mode, an etymology mode, and an image mode;

receiving, by the processing device, a selection of a vocabulary learning mode from the group of vocabulary learning modes;

providing, by the processing device, a user interface and one or more tools for generation of a card for study of the word, wherein the one or more tools are based on the selected vocabulary learning mode; and generating the card by the processing device; and saving the card by the processing device.

12. The non-transitory computer readable storage medium of claim 11, wherein the selected vocabulary learning mode of the group of vocabulary learning modes is the story mode, the operations further comprising:

receiving a selection of one or more characters for a story associated with the definition of the word;

receiving a placement for the one or more characters;

receiving a user input of dialogue for the one or more characters, wherein the dialogue is associated with the definition of the word; and generating the card comprising the one or more characters and the dialogue.

13. The non-transitory computer readable storage medium of claim 12, the operations further comprising:

providing a selection of a plurality of pre-generated characters, wherein the one or more characters are selected from the plurality of pre-generated characters.

14. The non-transitory computer readable storage medium of claim 12, the operations further comprising:

providing a selection of a plurality of pre-generated objects;

receiving a selection of one or more objects from the plurality of pre-generated objects; and receiving a placement of the one or more objects, wherein the card further comprises the one or more objects.

15. The non-transitory computer readable storage medium of claim 11, wherein the selected vocabulary learning mode of the group of vocabulary learning modes is the etymology mode, the operations further comprising:

performing an additional search for an etymology of the word using the search engine;

receiving the etymology of the word based on the additional search;

displaying the etymology of the word;

receiving a user selection of at least one of text, a box, an arrow, an underline, or a highlight;

receiving a user selection of a portion of the word to apply at least one of the text, the box, the arrow, the underline, or the highlight to; and placing at least one of the text, the box, the arrow, the underline, or the highlight in relation to the portion of the word.

16. The non-transitory computer readable storage medium of claim 11, wherein the selected vocabulary learning mode of the group of vocabulary learning modes is the image mode, and wherein the one or more tools comprise drawing tools for drawing a picture, the operations further comprising:

receiving user input to draw a digital image.

17. The non-transitory computer readable storage medium of claim 11, wherein the group of vocabulary learning modes further comprises a word connections mode, and wherein the selected vocabulary learning mode of the group of vocabulary learning modes is the word connections mode and the one or more tools comprise font selection tools, the operations further comprising:

prompting the user to enter a phrase associated with the word;

receiving user input for the phrase; and receiving user input for at least one of a bold font, an italics font, a strikethrough font, or an underline font for a portion of the phrase.

18. The non-transitory computer readable storage medium of claim 11, the operations further comprising:

receiving an additional selection of a second vocabulary learning mode from the group of vocabulary learning modes;

providing an additional user interface and one or more additional tools for generation of an additional card for study of the word, wherein the one or more additional tools are based on the second vocabulary learning mode; and combining the card and the additional card to generate a single card having a first section comprising information from the card and a second section comprising additional information from the additional card.

19. A computing device comprising:

a memory; and a processor operatively connected to the memory, wherein the processor is to:

receive an input of a word that is to be learned by a user;

generate a search query for a definition of the word;

send the search query to a search engine, wherein the search engine comprises a public search engine accessible via a network;

receive one or more search results based on the search query;

select the definition of the word from the one or more search results;

prompt the user to rewrite the definition;

receive a user input of a new definition for the word;

prompt the user to select a vocabulary learning mode from a group of vocabulary learning modes comprising a story mode, an etymology mode, and an image mode;

receive a selection of a vocabulary learning mode from the group of vocabulary learning modes;

provide a user interface and one or more tools for generation of a card for study of the word, wherein the one or more tools are based on the selected vocabulary learning mode;

generate the card based on user input; and save the card.

20. The non-transitory computer readable storage medium of claim 11, wherein each of the story mode, the etymology mode, and the image mode implements at least one of a motivation-based learning technique, an association-based learning technique, an emotion-based learning technique, or a color-based learning technique to facilitate retention of the definition of the word.

* * * * *